Aug. 18, 1959  S. NEVILLE ET AL  2,899,855
BOLT-TENSIONING DEVICES
Filed Aug. 21, 1957  2 Sheets-Sheet 1
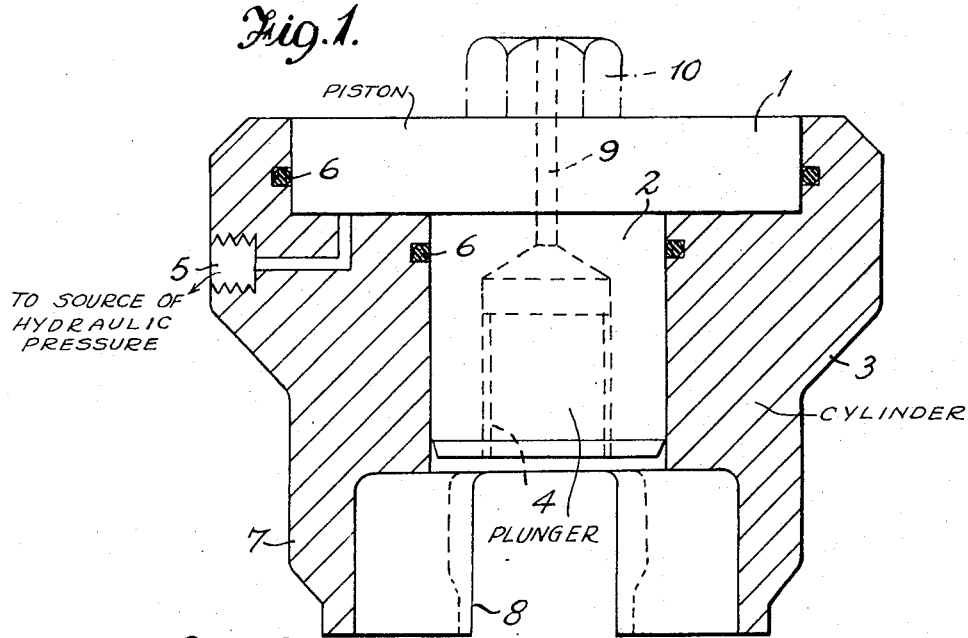
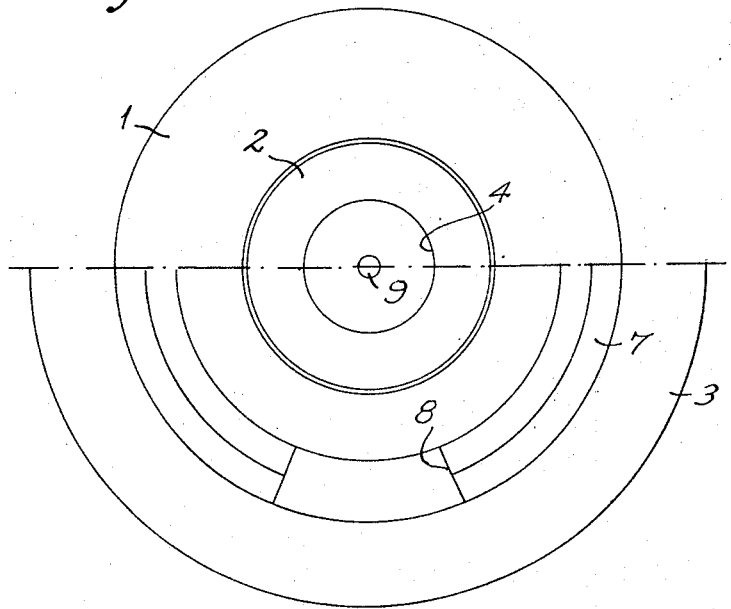
INVENTORS
SIDNEY NEVILLE
TREFOR OWEN
BY Norris & Bateman
ATTORNEYS

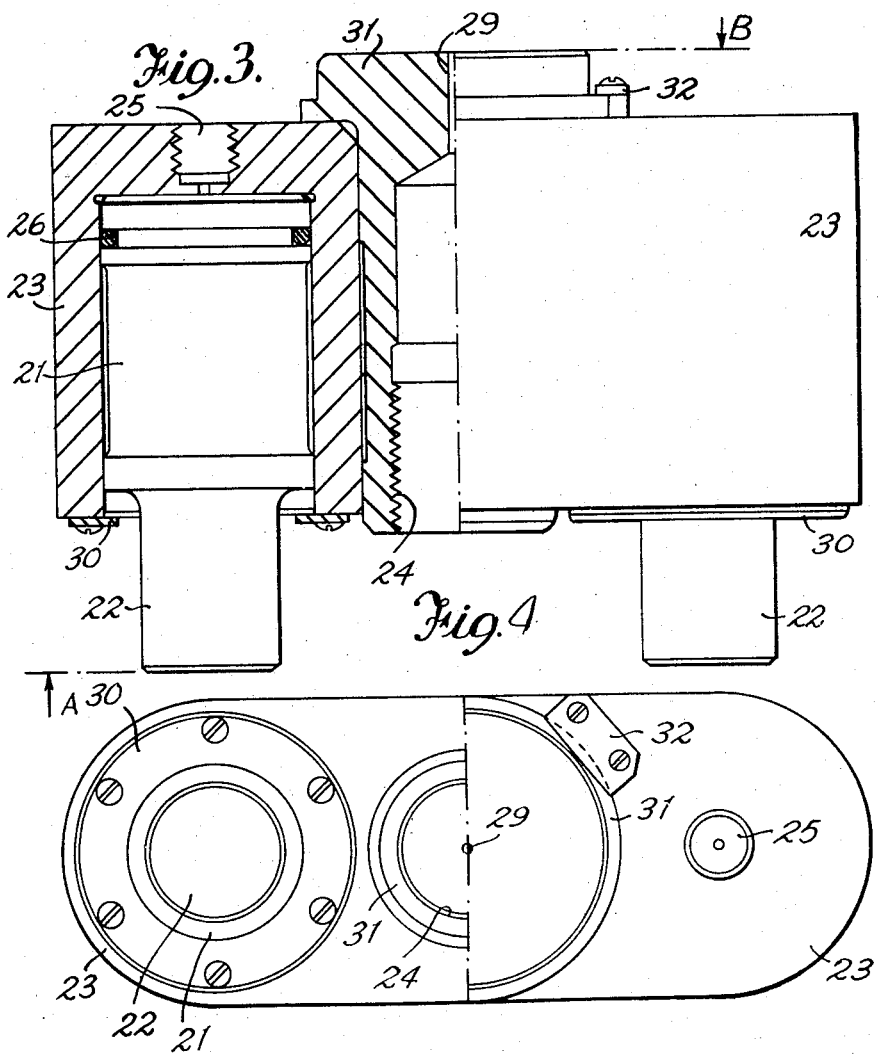

United States Patent Office 2,899,855
Patented Aug. 18, 1959

2,899,855

BOLT-TENSIONING DEVICES

Sidney Neville, Hale, England, and Trefor Owen, Denbigh, North Wales, assignors to Metropolitan-Vickers Electrical Company Limited, London, England, a British company Application August 21 1957, Serial No. 679,461

Claims priority, application Great Britain September 6, 1956

2 Claims. (Cl. 81—53)

This invention relates to the tightening and unscrewing of nuts on bolts and studs, particularly those of large size used in fastening together parts of large machines and where predetermined bolt tensions and clamping effects on parts so bolted are necessary for the safe working of the machine.

It is known to use calibrated "torque spanners" for this purpose but their use can entail considerable physical effort and the accuracy of the final tension obtained on the nut and bolt combinations and the compression of the bolted parts are subject to the accuracy of calculated allowances for interpart friction, a quantity which, in practice, can vary widely from that obtained from theoretical considerations and assumed conditions of manufacture and materials.

An object of the invention is to provide a bolt-tensioning tool which can be readily applied to a bolt or the like having a nut screwed thereon, for controlled and accurate tensioning of the bolt and to enable the nut to be tightened or released with ease and safety, and which can thereafter be removed from the bolt independently of the nut.

A further object is to provide a removable bolt-tensioning tool including a cylinder and piston assembly including means, for example a hand-operated pump, for admitting pressure liquid to the cylinder so as to force the piston out of the cylinder, and means for securing the piston assembly in operative association with a bolt, whereby increase of liquid pressure within the cylinder tensions the bolt to a predetermined value which is maintained after said pressure is released by tightening the nut.

The preferred embodiment of the invention comprises two cylinders rigidly secured side by side with their closed ends bearing against a bushing which is threaded internally for screwing on to the bolt to be tensioned. The pistons are formed with plungers extending outwardly of the cylinders to abut the member to be bolted and apply tension to the bolt acting through the bushing when pressure liquid is admitted to the cylinders. The bushings are removable for replacement by bushings having differently sized threaded bores to adapt the tool to suit different sizes of bolts.

The invention will be clearly understood from the following description of the drawings accompanying this specification, in which:

Figure 1 illustrates the principle of the invention and is an axial section through a cylinder containing a piston shown in elevation, and Fig. 2 is a view looking toward the lower end of Fig. 1;

Figs. 3 and 4 illustrate an embodiment of the invention, Fig. 3 being a part sectional view similar to Fig. 1, and Fig. 4 being a composite end view of Fig. 3 in which the left and right halves are taken in the direction of the arrows A and B respectively in Fig. 3.

Referring to Figs. 1 and 2, the device illustrated comprises a piston 1 formed with an axially extending plunger 2, and a cylinder 3. The plunger 2 passes with a sliding fit through the inner end of the cylinder 3 and is threaded internally at 4 to enable it to be screwed onto the end of the bolt (not shown) to be tensioned. An oil entry 5 is provided in the cylinder wall for connection to a hydraulic pressure source (for example a hand-operated pump), whereby liquid pressure can be applied to the underside of the piston 1 to force it outwardly, that is in an upward direction in Fig. 1. Suitable sealing rings 6 (e.g. of neoprene) are provided in recesses on the piston and plunger.

The end of the cylinder adjacent the bolt (that is the lower end in Fig. 1) is formed with a skirt 7 the inner diameter of which is sufficiently large to enable it to straddle or pass over a nut screwed onto the bolt. The wall of the skirt is formed with one or more side openings 8 through which a spanner or a suitable bar can be inserted to engage the nut. The nut may be circular with a number of radial holes to receive an end of said bar. A duct 9 leading through the plunger and the piston allows air to escape when screwing the piston on to a bolt, and a boss 10 may be provided, as shown dotted, on the outer end of the piston to allow it to be turned by a spanner or other suitable tool.

In use, the bolt and nut are assembled with the members to be bolted together, and the piston is screwed onto the bolt either by turning the whole cylinder assembly relying on the friction of the packing rings to turn the piston, or by a suitable tool engaging the boss 10 on the piston, to bring the end of the skirt 7 against the member. Liquid under pressure is then admitted through entry 5 to the cylinder to force the piston and plunger outwardly to exert a pull on the bolt. It will be seen that the end of the skirt 7 forms an abutment against which the member is drawn as the bolt is tensioned. As the area of the piston face is known, specific oil pressures to obtain a predetermiend tension value in the bolt can readily be calculated. When this value is reached, the nut can easily be screwed by hand, or by a tool inserted through opening 8, to the appropriate face of the member to be bolted while the tension in the bolt is safely maintained by pressure in the cylinder. When the pressure is released the nut and bolted part take up the tension in the bolt by reaction.

In order that the device may be adapted for use with different sizes of bolt, the plunger 2 may be made hollow to receive bushings which are internally threaded to suit the various bolt diameters as shown in Figure 3.

Figs. 3 and 4 illustrate an embodiment of the invention which comprises two pistons 21 mounted in side by side relationship in a cylinder block 23, in a manner to straddle the bolt. The pistons are provided with plungers 22 and sealing rings 26. Fluid under pressure is admitted to the cylinders through ports 25. A retaining ring 30 is secured to the end of each cylinder to retain the pistons within the cylinders.

The cylinder block 23 is adapted to receive a bushing 31 between the cylinders, which is threaded internally at 24 to fit the bolt to be tensioned. A plate 32 secured to the cylinder block engages a shoulder on the bushing to retain it in position. An air escape duct 29, corresponding to the duct 9 in Fig. 1, is provided in the end of bushings 31. Upon removal of plate 32 the bushing 31 can be removed from block 23 and changed for one with a different thread to suit various bolt diameters.

The operation of the device shown in Fig. 3 is similar to that of Fig. 1 and will be readily understood from the foregoing description. The bushing 31 is screwed onto the end of the bolt and the tension is effected by the plungers 22 moving out from the cylinder and abutting the member to be bolted. This embodiment is of particular advantage for coupling bolts, since it occupies less space radially to the coupling than the circular device of Fig. 1.

It will be appreciated that the tensioning tool according to this invention may with advantage be used also for releasing nuts from bolts by reversing the procedure. The bolt may be put under tension and so held while the nut is slacked off sufficiently to enable it to be unscrewed when the tension is removed.

Constructional modifications may be made as will occur to the skilled technician without departing from the scope of the invention described. For example, the retaining ring 30 (Fig. 3) may be replaced by one or more plates similar to the plate 32, and vice versa. The oil pump can usually be attached directly to the tensioning tool, but if more convenient it can be connected by a small-bore flexible tube, if necessary of considerable length.

The relationship between both stress and oil pressure will depend on the proportions of the apparatus employed; for example in a convenient design a bolt stress of 50,000 p.s.i. might require an oil pressure of 20,000 p.s.i., which presents no technical difficulty.

From the foregoing it will be seen that the invention provides a tool which can be readily applied for tensioning a bolt carrying a nut to enable the nut to be tightened or slackened. After this use the tool can be readily removed for use on another bolt, in contradistinction to tensioning devices which are embodied in and form a part of the permanent nut and bolt assembly.

What we claim is:

1. A bolt-tensioning tool for applying tension to a bolt which passes through a member and has a nut screwed thereon for fastening the member to a body on which the bolt is mounted, comprising in combination a pair of cylinders rigidly mounted side by side, said cylinders each containing a piston provided with a plunger extending outwardly in the same direction from said cylinders, means for securing said cylinder assembly to the end of said bolt with said plungers positioned either side of and parallel to said bolt, and means for admitting liquid under pressure to the interior of said cylinders so as to create a build-up of pressure therein, said pressure tending to force said pistons out of said cylinders and toward said member, thereby to apply tension to said bolt due to the reaction caused by said plungers bearing against said member.

2. A tool as recited by claim 1 comprising a cylinder block in which said pair of cylinders are mounted in side by side relationship, a bushing mounted in a bore in said block between said cylinders, said bushing being provided with an internally threaded portion for attachment to the end of said bolt to be tensioned, and means on said cylinder block engaging a shoulder on said bushing for retaining said bushing in said bore, said means being adapted to permit said bushing to be removed and replaced by an alternative bushing appropriate to a bolt of different thread to said first mentioned bolt.

References Cited in the file of this patent

UNITED STATES PATENTS

| | | |
|---|---|---|
| 2,736,219 | May | Feb. 28, 1956 |
| 2,756,622 | La Belle | July 31, 1956 |
| 2,760,393 | Stough | Aug. 28, 1956 |
| 2,820,382 | Smith | Jan. 21, 1958 |

FOREIGN PATENTS

| | | |
|---|---|---|
| 8,267 | Great Britain | Apr. 9, 1903 |
| 144,735 | Great Britain | May 25, 1921 |